United States Patent
Zheng et al.

(10) Patent No.: US 7,757,221 B2
(45) Date of Patent: Jul. 13, 2010

(54) APPARATUS AND METHOD FOR DYNAMIC BINARY TRANSLATOR TO SUPPORT PRECISE EXCEPTIONS WITH MINIMAL OPTIMIZATION CONSTRAINTS

(75) Inventors: Bixia Zheng, Palo Alto, CA (US); Cheng C. Wang, Cupertino, CA (US); Ho-seop Kim, Cupertino, CA (US); Mauricio Breternitz, Jr., Austin, TX (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 1321 days.

(21) Appl. No.: 11/241,610

(22) Filed: Sep. 30, 2005

(65) Prior Publication Data

US 2007/0079304 A1 Apr. 5, 2007

(51) Int. Cl.
*G06F 9/45* (2006.01)
(52) U.S. Cl. .................... 717/136; 717/137; 717/140; 717/145; 717/156; 717/151; 717/152
(58) Field of Classification Search ................ 717/136, 717/137, 140, 145, 146, 151
See application file for complete search history.

(56) References Cited

U.S. PATENT DOCUMENTS

| | | | | |
|---|---|---|---|---|
| 5,802,373 | A * | 9/1998 | Yates et al. | 717/139 |
| 6,502,237 | B1 * | 12/2002 | Yates et al. | 717/136 |
| 6,535,903 | B2 * | 3/2003 | Yates et al. | 718/100 |
| 6,961,932 | B2 * | 11/2005 | Mishra et al. | 717/136 |
| 7,065,750 | B2 * | 6/2006 | Babaian et al. | 717/136 |
| 7,120,898 | B2 * | 10/2006 | Grover et al. | 717/114 |
| 7,516,453 | B1 * | 4/2009 | Bugnion | 718/1 |
| 2002/0092002 | A1 * | 7/2002 | Babaian et al. | 717/137 |
| 2003/0101438 | A1 * | 5/2003 | Mishra et al. | 717/136 |
| 2003/0191622 | A1 * | 10/2003 | Rawsthorne et al. | 703/23 |
| 2004/0194070 | A1 * | 9/2004 | Baraz | 717/136 |
| 2004/0268330 | A1 * | 12/2004 | Grover et al. | 717/146 |
| 2005/0005265 | A1 * | 1/2005 | Knowles | 717/136 |

(Continued)

OTHER PUBLICATIONS

Beck et al, "Dynamic Reconfiguration with Binary Translation: Breaking the ILP Barrier with Software Compatibility", Jun. 2005, ACM, pp. 732-737.*
Ramsey et al, "A Transformational Approach to Binary Translation of Delayed Branches", ACM Transactions on Programming Languages and Systems, vol. 25, No. 2, Mar. 2003, pp. 210-224.*

(Continued)

*Primary Examiner*—Wei Y Zhen
*Assistant Examiner*—Charles Swift
(74) *Attorney, Agent, or Firm*—Blakely, Sokoloff, Taylor & Zafman LLP

(57) ABSTRACT

A method and apparatus for dynamic binary translator to support precise exceptions with minimal optimization constraints. In one embodiment, the method includes the translation of a source binary application generated for a source instruction set architecture (ISA) into a sequential, intermediate representation (IR) of the source binary application. In one embodiment, the sequential IR is modified to incorporate exception recovery information for each of the exception instructions identified from the source binary application to enable a dynamic binary translator (DBT) to represent exception recovery values as regular values used by IR instructions. In one embodiment, the sequential IR may be optimized with a constraint on movement of an exception instruction downward past an irreversible instruction to form a non-sequential IR. In one embodiment, the non-sequential IR is optimized to form a translated binary application for a target ISA. Other embodiments are described and claimed.

17 Claims, 15 Drawing Sheets

U.S. PATENT DOCUMENTS

| | | | |
|---|---|---|---|
| 2006/0013218 A1* | 1/2006 | Shore et al. | 370/389 |
| 2006/0095896 A1* | 5/2006 | Li et al. | 717/136 |
| 2006/0161908 A1* | 7/2006 | Bearman et al. | 717/162 |
| 2006/0253691 A1* | 11/2006 | Barraclough et al. | 712/244 |
| 2006/0294508 A1* | 12/2006 | Berkowits et al. | 717/136 |
| 2007/0006192 A1* | 1/2007 | Grover et al. | 717/146 |
| 2009/0187750 A1* | 7/2009 | Bugnion | 712/244 |

OTHER PUBLICATIONS

Sutter et al, "Link-Time Binary Rewriting Techniques for Program Compaction", ACM Transactions on Programming Languages and Systems, vol. 27, No. 5, Sep. 2005, pp. 882-945.*

Oh et al, "Memory Access Optimization of Dynamic Binary Translation for Reconfigurable Architectures", 2005, IEEE, pp. 1011-1017.*

* cited by examiner

```
N1   t1 = regionEntry()      302
N2   stvar s1 = t1
// for S1:
N3   t2 = ldvar s1  ~310
N4   t3 = t2 + ...
N5   stvar s1 = t3
//for S2:
N6   t4 = ldvar s1  ~312
N7   stind_II_El [ ... ] = t4  ~304
//for S3:
N8 ... = ldind_El [ ... ]  ~306
//for S4:
N9   t5 = ldvar s1  ~314
N10  t6 = t5 + ...
N11  stvar s1 = t6 ...
//for S5:
N12: t7 = ldvar s1  ~316
N13: stind_II_El [ ... ] = t7  ~308
N14: regionExit (S1)
```

```
//(II_ID, IINextSourceAddr)
(N7, S3) (N13, S6)      240
```

```
                              320
N1   t1 = regionEntry()
N2   stvar s1 = t1
N15: Pseudo_II  ~322
//for S1:
N3   t2 = ldvar s1  ~310
N4   t3 = t2 + ...
N5   stvar s1 = t3
//for S2:
N6   t4 = ldvar s1  ~312
N7   stind_II_El [ ... ] = t4  ~304
//for S3:
N8 ... = ldind_El [ ... ]  ~306
//for S4:
N9   t5 = ldvar s1  ~314
N10  t6 = t5 + ...
N11  stvar s1 = t6 ...
//for S5:
N12: t7 = ldvar s1  ~316
N13: stind_II_El [ ... ] = t7  ~308
V14: regionExit (S1)
```

```
//(II_ID, IINextSourceAddr)  240
(N7, S3) (N13, S6) (N15, S1)
```

FIG. 3

```
N1   t1 = regionEntry()              ⌐330
N2   stvar s1 = t1
N16  t8 = ldvar s1 ~332
N15  Psuedo_II (s1->t8) ~338
//for S1:           ~322
N3   t2 = ldvar s1 ~310
N4   t3 = t2 + ...
N5   stvar s1 = t3
//for S2:
N6   t4 = ldvar s1 ~312
N16  t9 = ldvar s1 ~334
N7   stind_II_EI [ ... ] = t4, s1->t9 ~340
//for S3:        ~304
N8   ... = ldind_EI [ ... ] ~306
//for S4:
N9   t5 = ldvar s1 ~314
N10  t6 = t5 + ...
N11  stvar s1 = t6 ...
//for S5:
N12  t7 = ldvar s1 ~316
N17  t10 = ldvar s1 ~336        342
N13  stind_II_EI [ ... ] = t7, s1->t10
N14  regionExit(S1)  ⌐308
```

```
//(II_ID, IINextSourceAddr)
(N7, S3)  (N13, S6)  (N15, S1)
 240
```

```
                                       ⌐350
N1   t1 = regionEntry()  338
N15  Psuedo_II (s1->t1) ~
N4   t3 = t1 + ...  ~322
N8   ... = ldind_EI [ ... ] ~306
N7   stind_II_EI [ ... ] = t4, s1->t3 ~340
N10  t6 = t3 + ... ~304
N11  stvar s1 = t6 ...
N13  stind_II_EI [ ... ] = t6, s1->t6 ~342
N14  regionExit(S1)  ~308
```

```
//(II_ID, IINextSourceAddr)
(N7, S3)  (N13, S6)  (N15, S1)
 240
```

FIG. 4

N1  r1 = regionEntry()
N4  r3 = r1 + ...  ⌇306   ⌇338
N8  ... = ldind_EI [ ... ],s1->r1
N7  stind_II_EI [ ... ] = r3, s1->r3  ⌇340
N10 r6 = r3 + ...  ⌇304
N11 stvar s1 = r6 ...  ⌇308   ⌇342
N13 stind_II_EI [ ... ] = r6, s1->r3
N14 regionExit(S1)

402

//(II_ID, IINextSourceAddr)
(N7, S3)  (N13, S6) (N15, S1)      240

//(EI_ID, ReachingII_ID)
(N8, N15) (N7, N7) (N13, N13)      260

| EI_ID | SMAP (srcReg->nativeReg, s1 ==eax) |
|---|---|
| N8 | r1 -> s1 |
| N7 | r3 -> s1 |
| N13 | r6 -> s1 |

APPARATUS AND METHOD FOR DYNAMIC BINARY TRANSLATOR TO SUPPORT PRECISE EXCEPTIONS WITH MINIMAL OPTIMIZATION CONSTRAINTS

FIELD

One or more embodiments relate generally to the field of binary application translation. More particularly, one or more of the embodiments relate to a method and apparatus for dynamic binary translator to support precise exceptions with minimal optimization constraints.

BACKGROUND

Generally, computer programs are initially written in high level program statements. In order to be executed by a computer, the program statements are compiled into machine instructions that a microprocessor can recognize and execute. The machine instructions are selected from a set of machine instructions unique to a particular instruction set architecture (ISA).

Computer program statements that have been decoded into machine instructions for a source ISA such as Intel® X86, may undergo a binary translation in order to be executed at a target ISA, such as a reduced instruction set computer (RISC) architecture, or a very long instruction word (VLIW) architecture.

The translation may be performed by a dynamic translator, typically stored in memory. During translation, instructions are typically translated one basic block of instructions (BB) at a time and stored in memory. For example, each basic block of instructions may include a contiguous sequence of non-branch instructions (i.e., do not change order of executing instructions) which typically ends with a branch instruction.

Unfortunately, translated executable (binary) applications are generally not optimized in order to take advantage of the various optimization techniques provided by the target ISA. The performance of the target ISA is often a function of how well the processor manipulates and controls the flow of data within the system. As such, a target ISA can generally provide increased speed and throughput of instructions executed by the processor, as a result of several decades of engineering and research for optimizing instruction execution and data throughput as compared to a legacy (source) ISA. For example, the processors of the target ISAs achieve increased performance by executing instructions out of their original program order. By scheduling instructions according to availability of machine resources the processor is allowed to take advantage of parallelism inherent in the code.

Unfortunately, optimization of translated code is generally prohibited since the translation is generally limited to execution of translated instructions according to the program order provided in the source binary application. Otherwise, it may be difficult to determine a source ISA application state, according to a current target ISA application state. Furthermore, a single source or legacy instruction may be translated into several target ISA instructions. As a result, it is often difficult to determine correspondence between a target ISA application instruction and a source ISA application instruction.

Hence, the fact that instructions, such as load, store and floating point instructions may cause exceptions generally prohibits dynamic binary translation (DBT) optimizations. This challenge is posed due to the fact that native instructions in a translated region may generate exceptions.

Supporting such enabling exceptions is essential to provide full binary compatibility in a DBT system. On the other hand, straightforward recovery of such exceptions may severely constrain optimizations. For example, it may not be possible to move an update of a register past an exception instruction because doing so may change the machine state, as seen by, for example, an exception handler. As another example, reordering of loads that may cause segmentation errors is prohibited because reordering changes the order of exceptions raised by exception instructions.

BRIEF DESCRIPTION OF THE DRAWINGS

The various embodiments of the present invention are illustrated by way of example, and not by way of limitation, in the figures of the accompanying drawings and in which:

FIG. 3 illustrates an intermediate representation (IR) of a source binary application modified to include identified exception instructions (EI), irreversible instructions (II) and inserted, pseudo II instructions, in accordance with one embodiment.

FIG. 4 illustrates an IR representation of a source binary application modified to represent a source mapping of registers and code motion, in accordance with one embodiment.

FIG. 6 illustrates an optimized translated binary application from a source instruction set architecture (ISA) to a target ISA, in accordance with one embodiment.

DETAILED DESCRIPTION

A method and apparatus for dynamic binary translator to support precise exceptions with minimal optimization constraints are described. In one embodiment, the method includes the translation of a source binary application generated for a source instruction set architecture (ISA) into a sequential, intermediate representation (IR) of the source binary application. Once the sequential IR is generated, in one embodiment, the sequential IR is modified to incorporate exception recovery information for each exception instruction identified from the source ISA binary application. In one embodiment, incorporation of exception recovery information within the sequential IR enables a dynamic binary translator (DBT) to represent exception recovery values to support precise exceptions as regular values used by IR instructions. In one embodiment, the sequential IR may be optimized by, for example, copy propagation, code motion, dead code elimination with the constraint of prohibiting movement of an identified exception instruction (EI) downward in passing a predetermined II instruction. In one embodiment, the modified, non-sequential IR may be further optimized to form a translated binary application for a target ISA.

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that the invention may be practiced without such specific details. In other instances, control structures and gate level circuits have not been shown in detail to avoid obscuring the invention. Those of ordinary skill in the art, with the included descriptions, will be able to implement appropriate logic circuits without undue experimentation.

In the following description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like.

System

Figure 1:
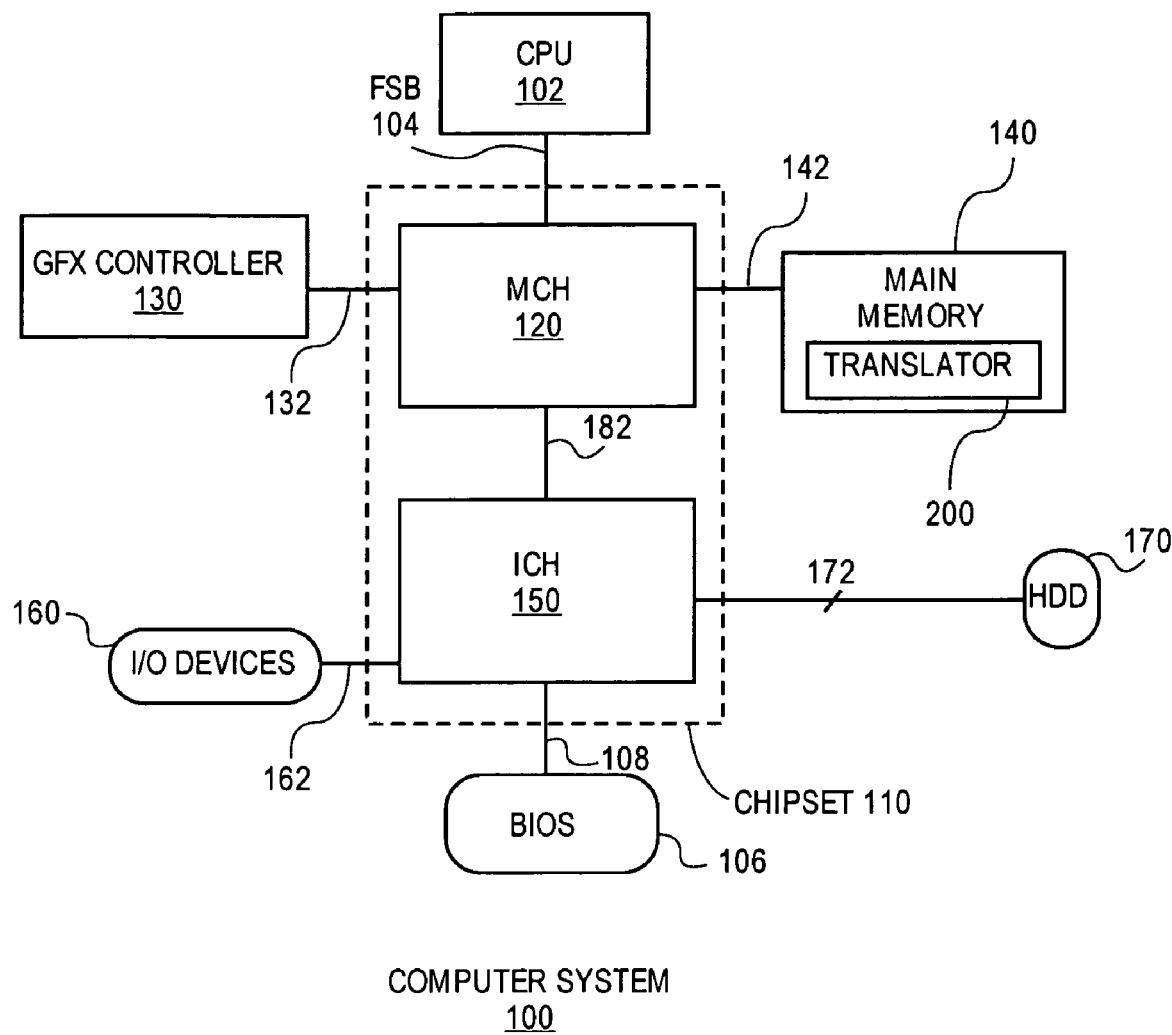
FIG. 1 is a block diagram illustrating a computer system including a dynamic binary translator to support precise exceptions with minimal optimization constraints, in accordance with one embodiment.

FIG. 1 is a block diagram illustrating a computer system 100 including a dynamic binary translator 200 to support precise exceptions with minimal optimization constrains, in accordance with one embodiment. Representatively, computer system 100 comprises a processor system bus (front side bus (FSB)) 104 for communicating information between processor (CPU) 102 and chipset 110. As described herein, the term "chipset" is used in a manner to collectively describe the various devices coupled to CPU 102 to perform desired system functionality. In one embodiment, CPU 102 may be a multicore chip multiprocessor (CMP).

Representatively, chipset 110 may include memory controller hub (MCH) 120 coupled to graphics (GFX) controller 130 via an interconnect 132. In an alternative embodiment, GFX controller 120 is integrated into MCH 120 such that, in one embodiment, MCH 120 operates as an integrated graphics MCH (GMCH). Representatively, MCH 120 is also coupled to main memory 146 via interconnect 142. In one embodiment, main memory 140 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data.

As further illustrated, chipset may include an input/output (I/O) controller hub (ICH) 150. Representatively, ICH 150 may include a universal serial bus (USB) link or interconnect 102 to couple one or more I/O devices 160 to ICH 150. In an alternative embodiment, I/O devices 160 may be coupled to ICH 150 via a point-to-point link, including, but not limited to, peripheral component interconnect (PCI) Express (PCI-Express) or other like point-to-point interconnect. Likewise, a serial advance technology attachment (SATA) 172 may couple hard disk drive devices (HDD) 170 to ICH 150. In one embodiment, basic input/output system (BIOS) 106 initializes computer system 100.

Although chipset 110 is illustrated as including a separate MCH 120 and ICH 150, in one embodiment, MCH 120 may be integrated within CPU 102. In an alternative embodiment, the functionality of MCH 120 and ICH 150 are integrated within chipset 110. In one embodiment, dynamic binary translator 200 may be implemented within computer systems including an MCH integrated within a CPU, an MCH and ICH integrated within a chipset, as well as a system on-chip. Accordingly, those skilled in the art should recognize that FIG. 1 is provided to illustrate one embodiment and should not be construed in a limiting manner.

Figure 2:
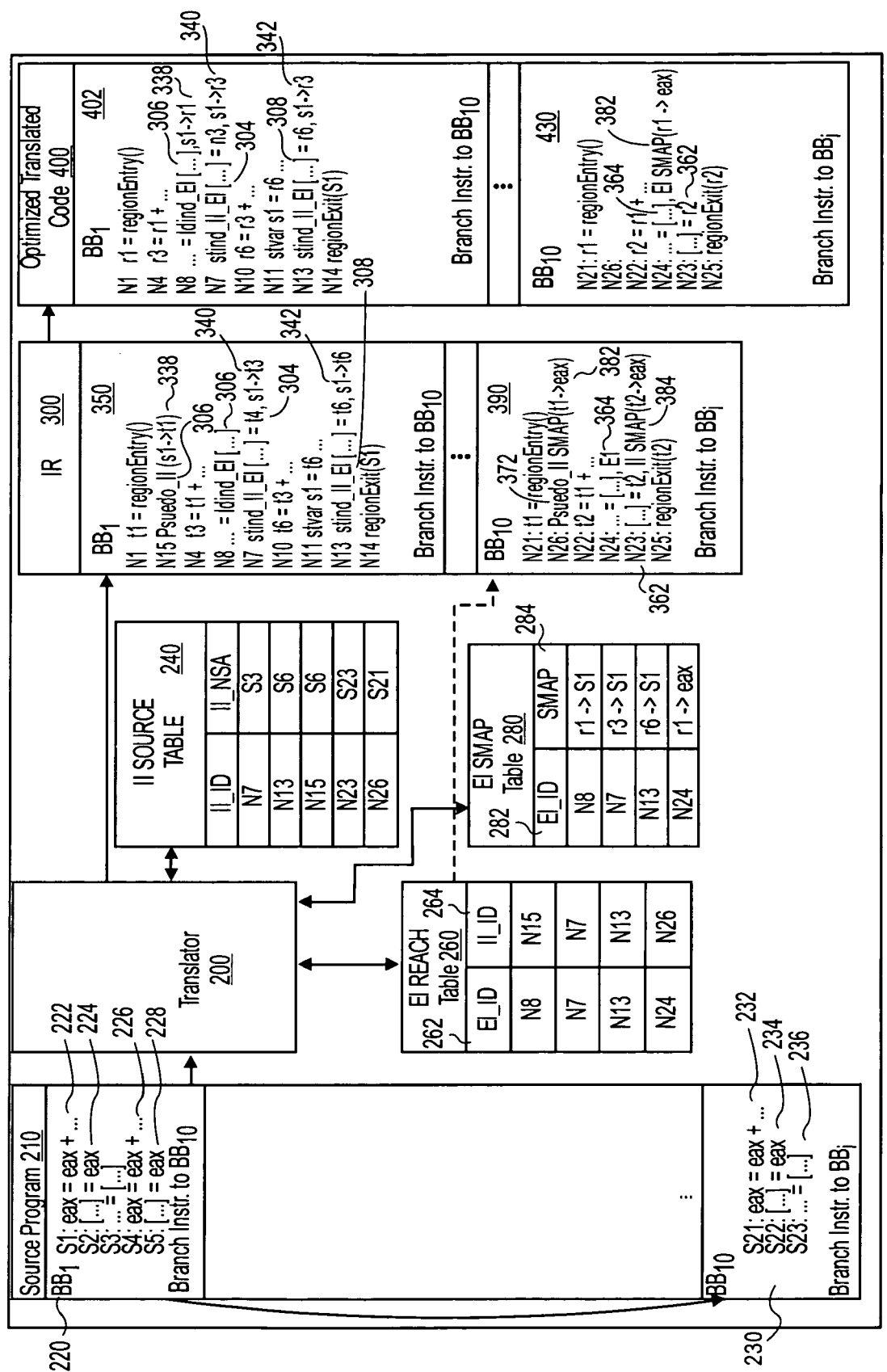
FIG. 2 is a block diagram further illustrating translation of a source program into an optimized translated code, in accordance with one embodiment.

In one embodiment, dynamic binary translator (DBT) 200 incorporates information required for recovery from an exception into an intermediate representation (IR), for example, as illustrated in FIG. 2. In one embodiment, the incorporation of information required to recover from an exception, is referred to herein as "exception recovery information." In one embodiment, incorporation of exception recovery information enables DBT 200 to provide additional optimizations of translated binary code to take advantage of the features of a target instruction set architecture (ISA), for example, as shown in FIG. 1.

FIG. 2 is a block diagram illustrating dynamic binary translation with support for precise exceptions with minimal optimization constraints, in accordance with one embodiment. Representatively, during dynamic binary translation, instructions are typically translated one block of instructions (BB) at a time and stored in memory in an area allocated for storing translating BBs. As such, the machine instructions of a source program 210 are typically translated and stored in memory in separate blocks of instructions. In one embodiment, each block of instructions consists of a contiguous sequence of non-branch machine instructions ending with a branch instruction.

Accordingly, a binary application, such as the source binary application 210 of FIG. 2, typically consists of multiple blocks of instructions stored in the physical static sequence (e.g., BB1, ..., BB10). As illustrated in FIG. 2, source program 210 may refer to code of a binary application that is written for a native or source instruction set architecture (ISA). In one embodiment, DBT 200 translates source program 210, which is written for a source ISA into optimized translated code 300 for a target ISA. In one embodiment, computer system 100 may be referred to as a very long instruction word (VLIW) architecture and is also referred to herein as the "target ISA." In contrast, as described herein, the term "source ISA" may refer to ISAs having instruction words that are smaller than the VLIW architecture capabilities of computer system 100.

In one embodiment, computer system 100 may refer to a computer architecture manufactured by the Intel Corporation of Santa Clara, Calif., to process, for example, 64-bit, 128-bit or larger instruction words. In contrast, source ISA may refer to computer architectures configured to handle 32-bit instruction words, such as, for example, the 32-bit Intel Architecture (IA-32) execution layer (IA32EL). Accordingly, in the embodiments described in further detail below, target ISAs, such as computer system 100, are required to provide compatibility with legacy or source ISAs by translating binary applications of the source ISAs according to a target ISA, of, for example, computer system 100. In one embodiment, the translation is performed using DBT 200.

Generally, DBTs, such as DBT 200, take advantage of information discovered at runtime to perform binary optimizations to improve performance using, for example, features that are available by a target ISA, but generally not supported by a source ISA. Unfortunately, the fact that instructions, such as, load, store and floating point instructions may cause exceptions, generally prohibits optimization binary of source binary applications. Supporting such exceptions is essential for providing full binary compatibility in DBT system.

Conversely, enabling recovery of exception handling may severely constrain optimization of a binary application that is translated for a target ISA. For example, optimization for the target ISA may not be able to move an update of a register past an EI instruction because doing so may change the machine state seen by an exception hander. As another example, reordering of load instructions that potentially cause segmentation errors is prohibited because such reordering of the exceptions raised by the two instructions may prevent precise exception handling.

In one embodiment, DBT 200 is designed to support precise exceptions with minimal optimization constraints. As described herein, to "support precise exceptions" may require the following: (1) the order of the exceptions that match that generated by the original source code; and (2) the exception handler should see the same processor state as if the original source raised the exception.

FIG. 2 is a block diagram illustrating translation and optimization of a source program where the optimized translated code 300 is modified to support precise exceptions with minimal optimization constraints, in accordance with one embodiment. In one embodiment, DBT 200 incorporates the information required to support precise exceptions into an intermediate representation 300, referred to herein as "exception recovery information." In one embodiment, exception recovery information is represented as one or more regular values within IR 300. In one embodiment, this allows DBT 200 to treat values used by exception handling in a similar way that values of the source program code 210 are treated to enable a reduction of optimization constraints on an optimized, translated binary application.

Referring again to FIG. 2, source code of basic block 212 includes both exception instructions (EI) and irreversible instructions (II). As described herein, an "exception instruction," or EI, may refer to an instruction, such as a load, store and division instruction, which may potentially generate a runtime exception. As described herein, an "irreversible instruction," or II, may refer to an instruction that changes the application state in a way that prohibits DBT 200 from recovering a previous application state. In other words, the execution of an II may prevent DBT 200 from rolling back and re-executing the II. In one embodiment, store instructions and system call instructions may be identified as irreversible instructions, or IIs.

Referring again to FIG. 2, source instruction S2 222 refers to a store instruction and may be identified as both an exception or EI instruction, as well as an irreversible or II instruction. Source instruction S3 234 is a load instruction and is identified by DBT 200 as an EI instruction, whereas source instruction S5 228 is referred to as both an EI instruction and an II instruction. In one embodiment, II source table 240 provides a data structure that may be used to track II instructions. In one embodiment, for each II instruction, an identification value (II_ID) 242 is assigned to the II instruction to enable unique identification of the II instruction. In addition, an address of the source instruction immediately following the II instruction (II_NSA) 244 is also stored within source table 240.

Accordingly, in one embodiment, if an EI instruction issues an exception at runtime, DBT 200 restores a source machine state to the state immediately following the execution of the nearest preceding II instruction. Once restored, in one embodiment, DBT 200 begins interpreting instructions beginning with the next source instruction immediately following the nearest, preceding II instruction, referred to herein as "a recovery point instruction." As described herein, a "recovery point instruction" may refer to an instruction in the source code, to restart execution for exception recovery.

Accordingly an II instruction may be conceptually referred to as defining a value of a consistent state and an EI instruction that uses a value of a consistent state defined by an II instruction may be referred to herein as an II instruction that reaches the EI instruction ("reaching II instruction"). As described herein, the "consistent state" defined by a reaching II instruction may refer to the source register values if the source code is sequentially executed up to the recovery point instruction corresponding to the reaching II. In one embodiment, each EI instruction is required to have a reaching II instruction. In some embodiments, an EI instruction might not have a reaching II instruction. Accordingly, in one embodiment, DBT 200 may insert pseudo II instructions into IR 300, such that each EI instruction includes a reaching II instruction In one embodiment, DBT 200 includes EI SMAP table 250. In one embodiment, table 280 represents an EI instruction identification (EI_ID) 282, a source register value needed to recover the consistent state defined by a corresponding reaching II instruction, and represents a virtual register mapping (SMAP) 284 for needed source registers of a source ISA. In one embodiment, DBT 200 may insert IR instructions within IR 300 to store source register values, which are required to enable reproduction of a consistent state at the corresponding reaching II instruction.

Referring again to FIG. 2, EI reach table 260 may store a unique identification value assigned to an EI instruction (EI_ID) 262 and for that EI instruction, table 260 stores a unique identification value assigned to the reaching II instruction (II_ID) 264 to enable the reaching II instruction to define a consistent state and a recovery point instruction. Accordingly, in one embodiment, the recovery point instruction indicated by a reaching II instruction refers to an instruction of the source code to restart exception for execution recovery. Furthermore, the mapping information from SMAP table 280 identifies the source register values that would be generated if the source code is sequentially executed up to the recovery point instruction to provide the consistent state at the reaching II instruction for exception recovery.

Accordingly, source table 240, EI reach table 260 and SMAP 280 illustrate the values stored to enable the definition of a consistent state at various reaching II instructions of corresponding EI instructions to support precise exceptions. In one embodiment, following such translations and optimization of source program 210 by DBT 200, optimized translated code 400 is provided, which may include, for example, code motion, dead code elimination, as well as additional optimizations following the binding of EI instructions and their corresponding reaching II instructions. Accordingly, in one embodiment, optimizations may be performed by DBT 200 for source binary code 210. In one embodiment, the explicit constraint on such optimizations required to support precise exceptions is the prevention of the movement of an EI instruction downward past an II instruction.

Figure 7:
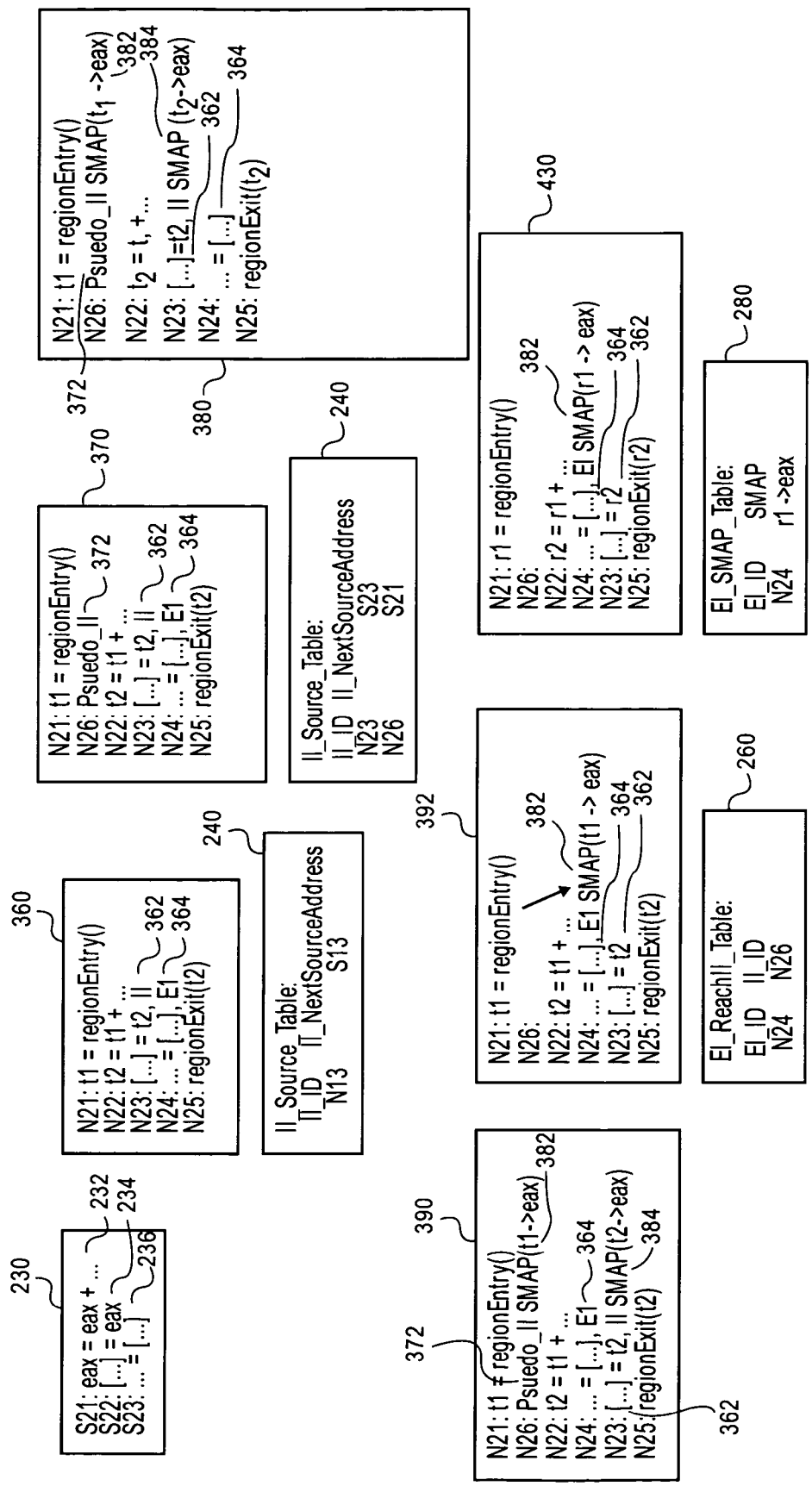
FIG. 7 is a block diagram illustrating dynamic binary translation to support precise exceptions, in accordance with one embodiment.

FIGS. 3-7 illustrate the process of dynamic binary translation and optimization, as performed by DBT 200 for source code block 220 of source program code 210, as shown in FIG. 2. Representatively, FIGS. 3-7 illustrate the generation of the IR representation of BB1 350, BB10 390 of IR 300 and the representation of BB1 402 and BB10 430 of optimized translated code 400, as shown in FIG. 2. In the IR representation of the translation regions 302-359, as shown in FIGS. 3-6 and translation regions 360-392 as shown in FIG. 7, $t_j$ is an integer) is used to represent a static, single assignment (SSA) temporary variable, $s_j$ to represent an IR variable corresponding to source register $s_j$ and $n_j$ to represent an IR variable from which native register $n_j$ is preassigned before register allocation.

As known to those skilled in the art, static single assignment format or SSA form, is an intermediate representation that effectively separates the values operated in a program from the locations they are stored in to enable more effective versions of several optimizations. Generally a procedure is in SSA form if every variable is assigned a value in the procedure occurs as the target of only one assignment.

FIG. 3 illustrates translation regions 302 and 320 to depict the identification of EI instructions and II instructions, as well as the insertion of instructions to load values to enable definition of a consistent state at corresponding II instructions (N1-N1) or inserted pseudo II instructions, according to one embodiment. Representatively, as shown in FIG. 3, each source instruction (SI) is translated into a sequence of IR instructions (N1-N14). As indicated by IR translation region 302, source instructions S2 224, S3 226 and S5 228 of source program block 220, shown in FIG. 2, are identified as EI instructions 304, 306 and 308.

However, EI instructions 304 and 308 are also load instructions, which may be identified as both II instructions and EI instructions ("II/IE"). Accordingly, as shown in translation region 302, EI instruction 306 is identified by "ldind_EI," while EI/II instructions 304 and 308, are identified by "stind_II_EI." As shown in II source table 240, an identification value (II_ID) 242 and a next source address (II_NSA) 246 of II/IE instructions 304 and 308 are stored in table 240.

As further shown by translation region 320, a pseudo II instruction 322 is inserted into the regionEntry( ) and an identification value (N15) and a source address pair (s1) 322 (N15, S1) are added to II source table 240. As shown, a "ldvar" instruction (310-316) are inserted within translation regions 302 and 320 to load the values for the consistent state corresponding to the II instructions. A pseudo II instruction 322 is inserted at the entry of the translated region 320. As further illustrated in FIG. 4, an SMAP representation (340, 342) is added to the two stind_II_EI instructions 304 and 308.

FIG. 4 illustrates translation regions 330 and 340, in accordance with one embodiment. Representatively, instructions 332-336 to load values for enabling the definition of a consistent state at corresponding II instructions and pseudo II instructions are added to translation region 330. In addition, an SMAP representation 340 and 342 are added to EI/II instructions 304 and 308 to represent a register mapping for the consistent state defined by the two instructions. Furthermore, SMAP representation 338 is added to Pseudo II instruction 322.

In one embodiment, following identification of all the II instructions and generating the needed pseudo II instructions, as shown in FIG. 4, IR instructions 332-336 are generated to represent the source register values needed to recover the consistent state as pseudo uses and represent the virtual register mapping for the needed source registers. This IR representation is generated for each II instruction in process block 530.

For example, assume SMAP_SRegs(II) is the set of source registers whose values are needed to recover the consistent state defined by an II instruction. For each source register $s_i$ (l=1...m) in SMAP_SRegs(II), an IR instruction is generated to load the source register value and store the value to a symbolic register $t_i$, such that $t_i = s_i$.

$$\text{SMAP}(s_1 \rightarrow t_1, s_2 \rightarrow t_2, \ldots s_m \rightarrow t_m) \quad (1)$$

is associated with the II instruction to represent that after the execution of the instruction, the value of source register $s_i$ is stored in virtual register $t_i$.

For one embodiment, the actual set of SMAP_SRegs for each II is a subset of all the source registers and can be determined by performing data flow analysis on the code region that includes the II instruction and all the EI instructions it reaches. As known to those skilled in the art, the purpose of dataflow analysis is to provide global information about how a procedure (or a larger segment of a program) manipulates its data. Accordingly, in one embodiment, dataflow analysis may be used to determine such global information about the source register values required to achieve a consistent state at one or more II instructions.

As further illustrated by translation region 350, IR optimization is performed from translation region 330. Representatively, copy propagation, dead code elimination and code motion are performed. As a result of the IR optimizations, EI instruction 306 is moved ahead of EI/II instruction 304. In addition, the one too many correspondence between the original source instructions 220 and the IR instructions is removed to prohibit obscuring the details of the invention. Translation region 350 is also shown in FIG. 2 within IR 300.

Figure 5:
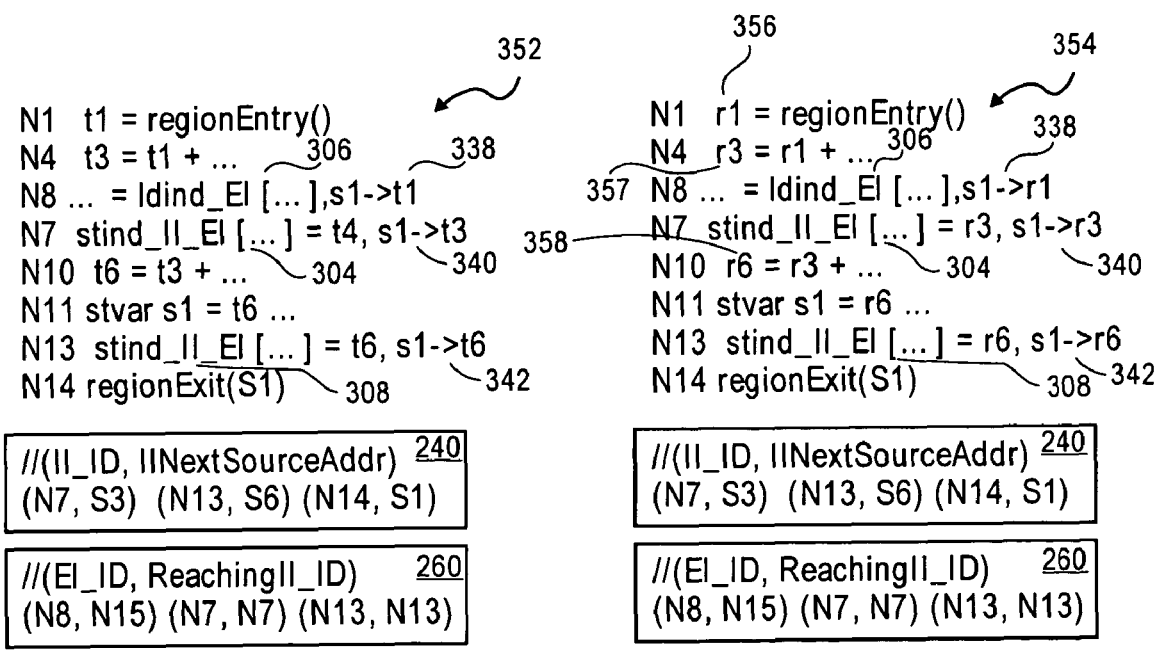
FIG. 5 is a flowchart illustrating an IR representation of a source binary application to illustrate binding of EI instructions and II instructions in addition to optimization and register allocation, in accordance with one embodiment.

FIG. 5 illustrates translation regions 352 and 354, in accordance with one embodiment. As illustrated by translation region 352, in one embodiment, pseudo II instruction 338 is identified as the reaching II instruction to define the consistent state for recovering the exception generated by EI instruction 306. Representatively, a copy of the SMAP information 338 associated with pseudo II instruction 322 is copied to EI instruction 304. In addition, an EI_ID and a reaching II_ID (N8, N14) of EI instruction 306 are added to EI reach table 260.

Conversely, the reaching II instructions for EI/II instructions 304 and 308 are selected as the respective EI/II instructions. Accordingly, in one embodiment, no changes are made to the existing SMAP information associated with these two instructions. As shown by EI reach table 260, the following pairs (N7, N7) and (N13, N13) are recorded within EI reach table 260. Referring again to FIG. 5, translation region 354 illustrates modification of translation region 352 after register allocation. Representatively, variables s1 and temporary variables t1, t2, etc. are placed with native registers r1 356, r3 357 and r6 358.

FIG. 6 illustrates translation region 402 of optimized translated code 400, according to one embodiment. Representatively, the SMAP table 280 is modified to add mapping information. In each row, the table has two entries: EI instruction represented as the IR instruction ID 282 and the SMAP information 284 for the consistent state. In one embodiment, table 280 along with source table 240 and reach table 260, provide all the needed information to enable exception recovery to support precise exceptions.

For example, if the native instruction corresponding to the EI instruction (N8) 306 generates an exception at runtime, we use the native register r1 to recover the value of the source register EAX and then start the interpretation from source instruction s1 to recover the exception. If the native instruction corresponding to EI instruction 304 raises an exception at runtime, we use native register r3 to recover the value for the source register S1 (EAX) and deliver the exception to the user exception handler. Translation region 402 of optimized translated code 400 is also shown in FIG. 2.

The process of dynamic binary translation and optimization, as shown in FIG. 7, is illustrated while omitting IR instructions required to load source register values. Procedural methods for implementing the described embodiments for DBT translation, as well as the process described in FIG. 7, are now provided.

Operation

Figure 8:
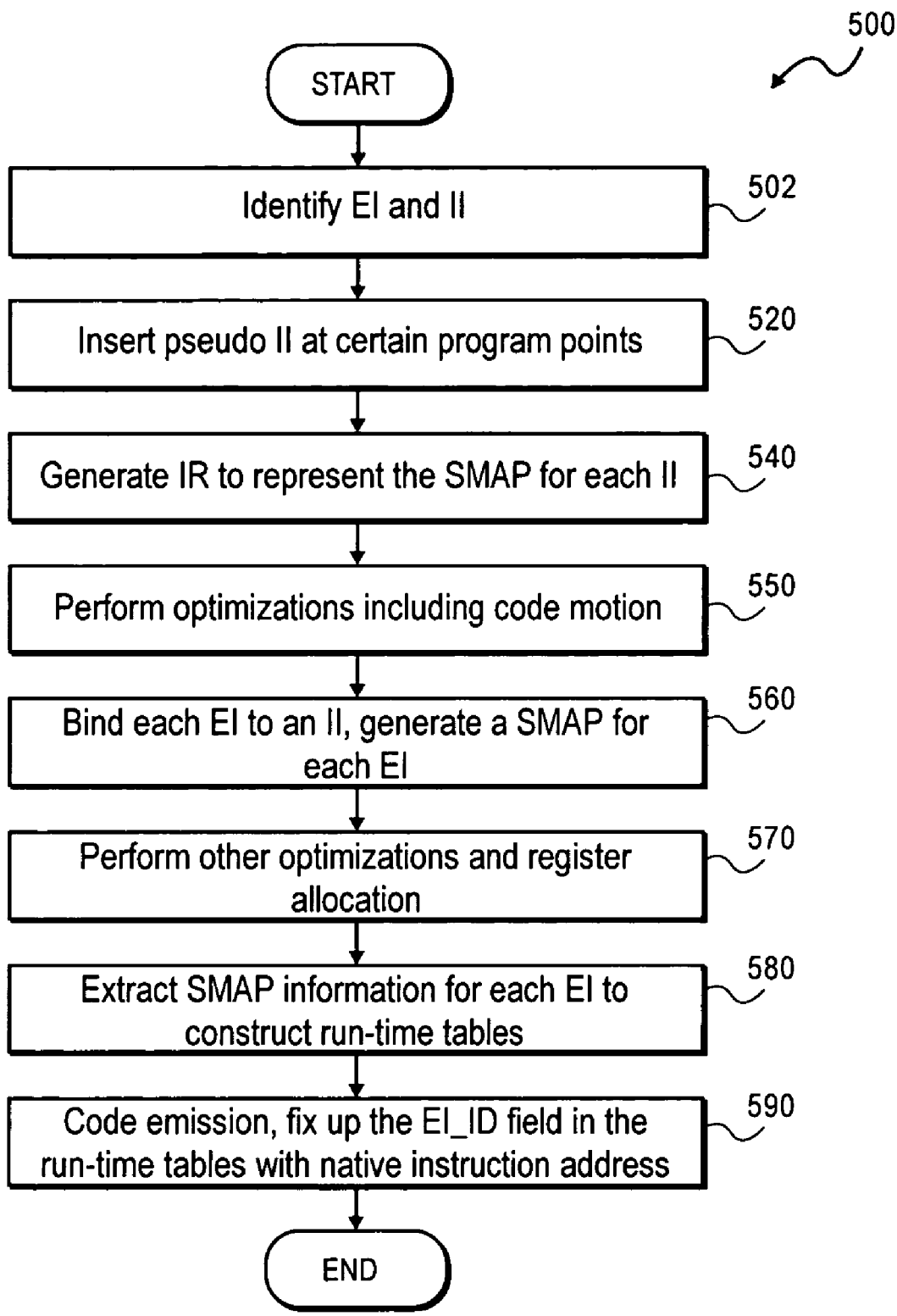
FIG. 8 is a flowchart illustrating a method for dynamic binary translation to support precise exceptions with minimal optimization constraints, in accordance with one embodiment.

Turning now to FIG. 8, the particular methods associated with various embodiments are described in terms of computer software and hardware with reference to a flowchart. The methods to be performed by a computing device (e.g., an endpoint/link controller) may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 8 is a flowchart illustrating a method 500 for a dynamic binary translator to support precise exception with minimal optimization constraints, in accordance with one embodiment. In the embodiments described, examples of the described embodiments are made with reference to FIGS. 1-7. However, the described embodiments should not be limited to the examples provided to limit the scope provided by the appended claims. Furthermore, the dynamic binary translation method 500, as shown in FIG. 8, is described with reference to the flowcharts of FIGS. 9-16. For the purposes of the following description, process block 502 is further described with reference to FIG. 9.

Figure 9:
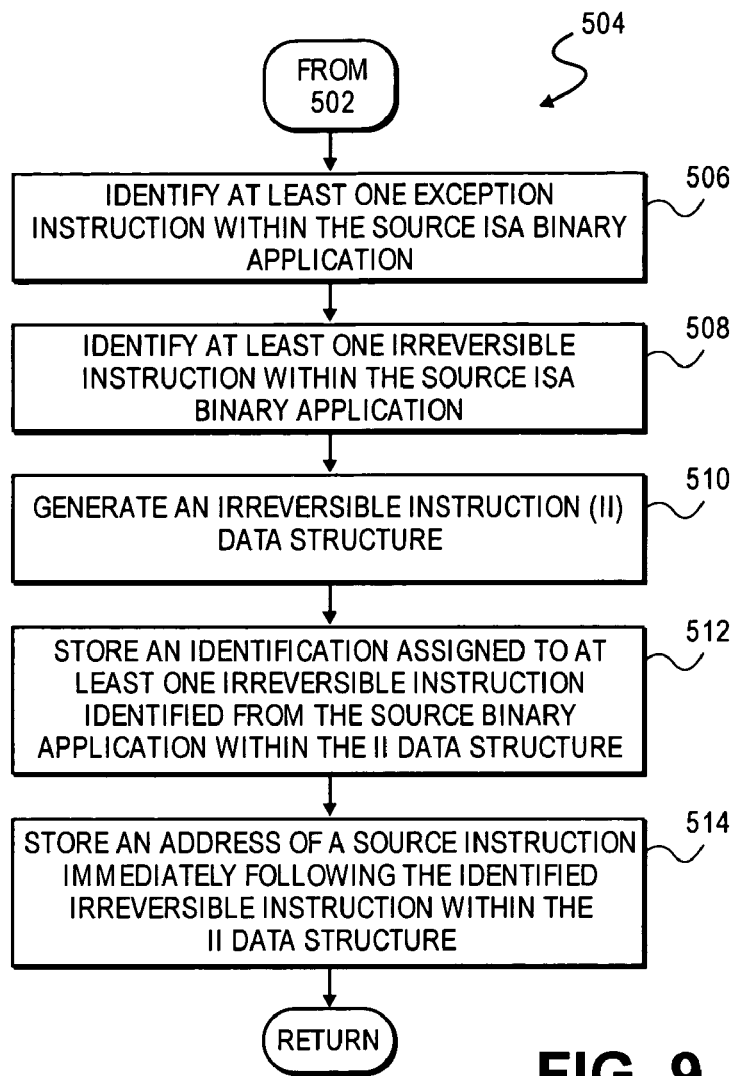
FIG. 9 is a flowchart illustrating a method for populating a data structure to track recovery point instructions corresponding to detected EI instructions, in accordance with one embodiment.

FIG. 9 is a flowchart illustrating a method 504 for identification of EI and II instructions, in accordance with one embodiment. Referring again to FIG. 8, at process block 502, EI instructions and II instructions are first identified. As shown in FIG. 3, II instruction 362 and EI instruction 364 are identified within translation region 360. In one embodiment, identification of EI and II instructions is performed during the translation of source binary instruction to IR and before an optimization. For example, the source load and division instructions are identified as EI instructions and the store instructions are identified as both EI instructions and II instructions (EI/II) instructions. In one embodiment, analysis may be performed to avoid marking the instructions that will not cause exception as EI instruction.

As shown in FIG. 9, EI instructions and II instructions are identified at process blocks 506 and 508. At process block 510, a runtime table is generated. In one embodiment, the runtime table is illustrated as II_Source Table 240, as shown in FIG. 7. At process blocks 512 and 514, for each II instruction, a pair of values (II_ID, II_NextSourceAddress) is recorded in, for example, II source table 240. In one embodiment, II_ID is a unique ID to identify the II instruction in IR 300 and II_NextSourceAddress is the address of a source instruction right after the II instruction (II_NSA) that is selected as a recovery point instruction as shown in FIG. 7.

Referring again to FIG. 8, at process block 520, pseudo II instructions are inserted at certain program points. In one embodiment, the insertion of pseudo II instructions performed at process block 520 ensures that for each EI instruction, there is one II instruction that reaches the EI instruction. This makes it possible to statically determine a recovery point instruction for each EI instruction. As shown in FIG. 7, pseudo II instruction 372 is inserted at the entry of the translated region 370, to ensure that the first EI instruction in region 364 has a reaching II instruction. In one embodiment, if the region being translated has control-flow joints, there may be more than one II instruction reaching an EI instruction.

Referring again to FIG. 8, similar to process block 502, at process block 520 for each pseudo II instruction, a pair of (II_ID, II_NSA) is also added to II_Source_Table 240 (see FIG. 7). As shown in FIG. 7, the II_NSA for pseudo II instruction 372 at the entry of the translated region 370 is the address of the first source instruction in region 370.

In one embodiment, representing the interpretation for recovering an exception raised by an EI instruction (362/364) will start from the first source instruction (N22) in region 370. The II_NSA for the pseudo II instruction at a control-flow joint point is the address of the first source instruction for the corresponding joint basic block. This means if multiple II instructions reach an EI instruction, the interpretation for recovering the exception raised by the EI instruction will start from the first source instruction in basic block where the paths from the multiple II instructions and the EI instruction first join.

In one embodiment, pseudo II instructions are inserted at control-flow joint points to ensure that only one consistent state reaches each EI instruction. In one embodiment, following identification of all the II instructions and generating the needed pseudo II instructions, as shown in FIG. 7, IR instructions 332-336 are generated to represent the source register values needed to recover the consistent state as pseudo uses and represent the virtual register mapping for the needed source registers. This IR representation is generated for each II instruction at process block 540 of FIG. 8.

Figure 10:
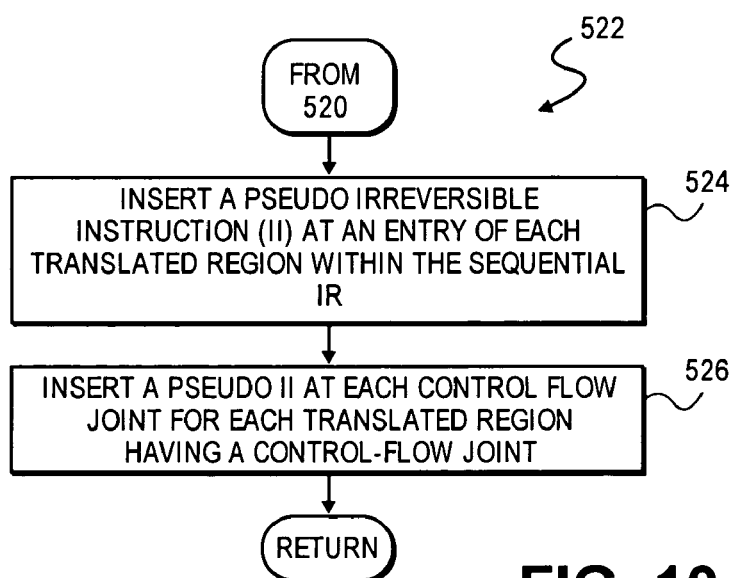
FIG. 10 is a flowchart for inserting pseudo recovery point instructions within a translated binary application, in accordance with one embodiment.

FIG. 10 is a flow chart illustrating a method 522 for inserting pseudo II instructions that control flow joints of a translation region in accordance with one embodiment. At process block 524, a pseudo II instruction is inserted as an entry of each translated region within an IR such as IR 300 as shown in FIG. 7. At process 526, a pseudo II instruction is inserted at each control flow joint for each translated region having a control flow joint. Further details regarding the insertion of pseudo II instructions or control flow joints are described in FIG. 11.

Figure 11:
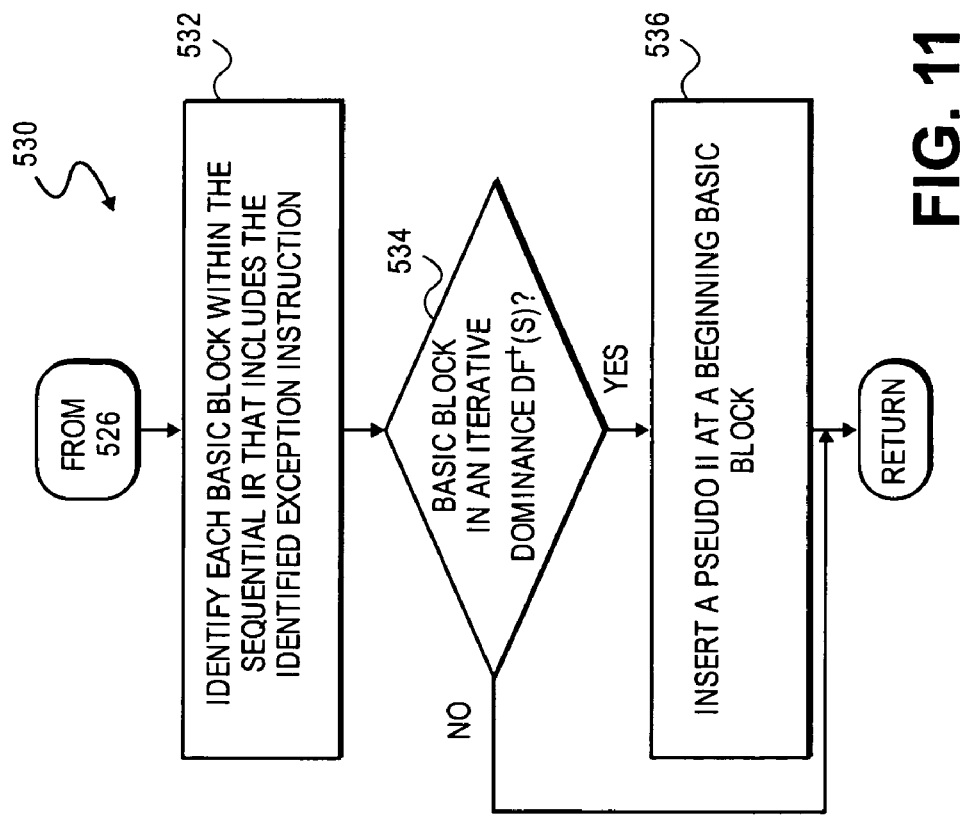
FIG. 11 is a flowchart illustrating a method for inserting pseudo recovery point instructions at control flow joints of a translated region, in accordance with one embodiment.

FIG. 11 is a flow chart illustrating a method 530 for inserting pseudo II instructions of control flow joints of process block 526 as shown in FIG. 10 in accordance with one embodiment. At process block 532, each block within a sequential II representation is identified that includes an EI instruction. Once identified at process block 534, it is determined whether the basic block is in an iterative dominance (DF+). Accordingly, assuming A represents all basic blocks with II instructions, in one embodiment, for each basic block within A in the iterative dominance frontier DF+(A), we insert as pseudo II instruction at the beginning of the basic block.

Figure 12:
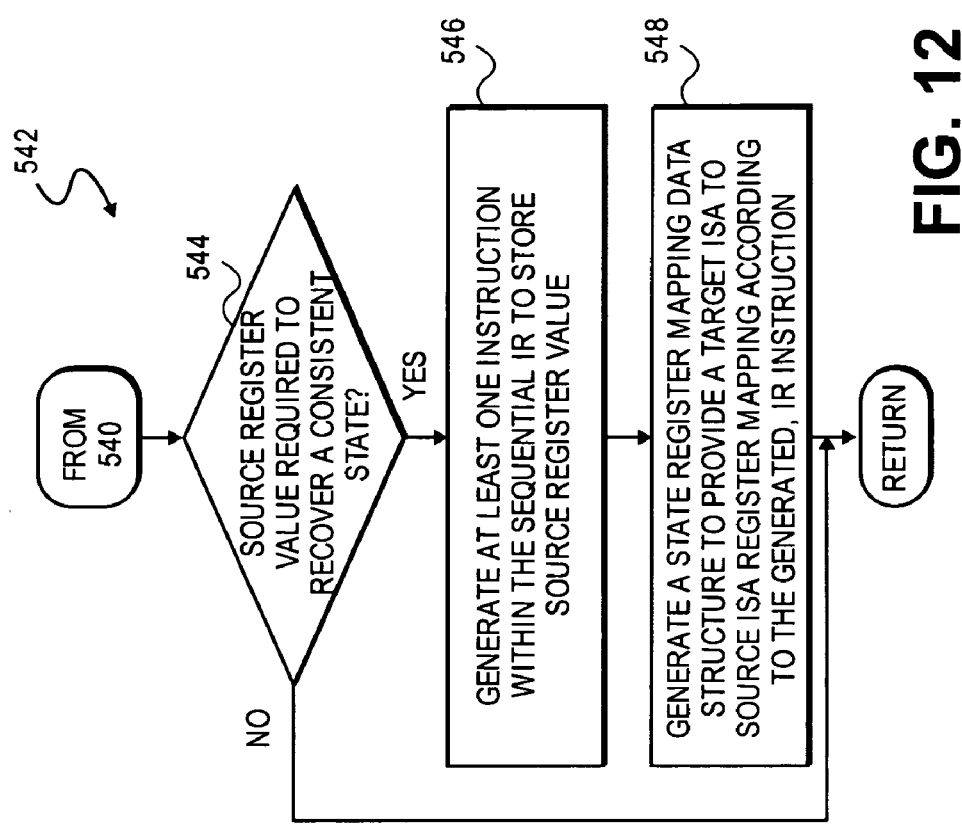
FIG. 12 is a flowchart illustrating a method for generating a state mapping table to enable recovery of a source ISA state at a predetermined recovery point instruction.

FIG. 12 is a flow chart illustrating a method 542 for generating the IR to represent the SMAP for each II by process 540 in accordance with one embodiment. At process block 544, it is determined whether a source register value is required to recover a consistent state at an II instruction. When such is the case, at process block 546, at least one instruction is generated within the IR representation to store the source register value. At process block 548, a state register mapping data structure is generated to provide a target ISA to source ISA register mapping according to the generated IR instruction, for example, as shown by translation region 330 as shown in FIG. 4. Representatively, as shown in FIG. 4, IR instructions 332, 334 and 336 are generated within translation region 330 for the source register S1.

Referring again to FIG. 8 at process block 550, IR optimizations are performed with certain constraints on code motions as shown by translation region 380 of FIG. 7. In particular, the movement of an instruction downward passing an II instruction is prevented. Assuming an EI instruction $EI_1$, which is right before an II instruction $II_1$ is moved down to right after $II_1$. When $EI_1$ generates an exception, $II_1$ has already been executed. This prevents the recovery of the consistent state for $EI_1$, which is the state prior to execution. Therefore, the movement of EI instruction down a passing II instruction is prevented.

Figure 13:
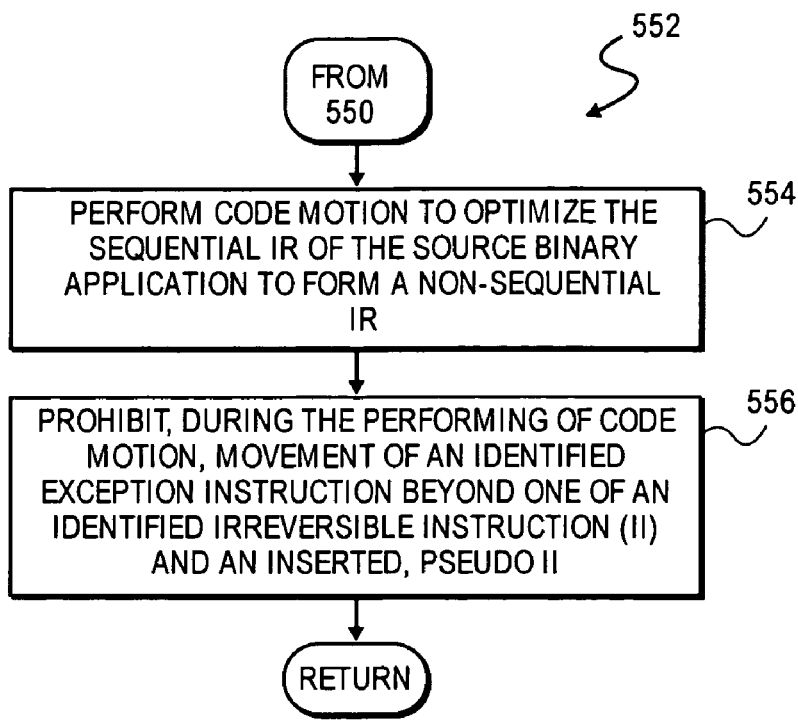
FIG. 13 is a flowchart illustrating a method for optimizing a sequential intermediate representation of a source binary application, in accordance with one embodiment.

FIG. 13 is a flow chart illustrating a method for performing optimizations of process block 550 as shown in FIG. 8 in accordance with one embodiment. At process block 554, code motion is performed to optimize a sequential IR representation of the source binder application to form a non-sequential IR. In one embodiment, copy propagation and debt code elimination may also be performed as part of process block 554. At process block 556, the code motion performed in process block 554 is monitored to prohibit the movement of an identified EI instruction beyond one of any identified II instructions and any inserted pseudo II instructions. An optimized intermediate representation as shown in FIGS. 2 and 7 as optimized translated region 390. Representatively, EI instruction 364 is reordered and moved before EI/II instruction 362.

In one embodiment, after binding all the II instructions to their reaching II instructions, the SMAP information associated with the II instructions is removed. In one embodiment, binding an EI instruction as shown in translation region 390 of FIG. 7, SMAP information 382 is more to reaching EI instruction 364 to an II instruction means that when the EI instruction generates an exception, DBT 200 (FIG. 2) restores the application state to the consistent state defined by the II instruction and starts interpretation from the source instruction right after the irreversible to recover the exception.

Referring again to FIG. 8, at process block 560, the reaching II instruction for each EI instruction is identified, according to one embodiment. The algorithm to discover the reaching II instruction for each EI instruction is similar to the SSA renaming algorithm to find out the correct version of an SSA variable that reaches a use of the variable. Then for each II instruction, the instruction is bound to its reaching II instruction by copying the SMAP information from the II instruction to the EI instruction. We also create a runtime table, EI_Reach_Table, to record pair (EI_ID, Reaching II_ID), where EI_ID is the unique ID to identify the EI instruction in the IR and Reaching II_ID is the unique ID to identify the II instruction that reaches the EI instruction.

Figure 14:
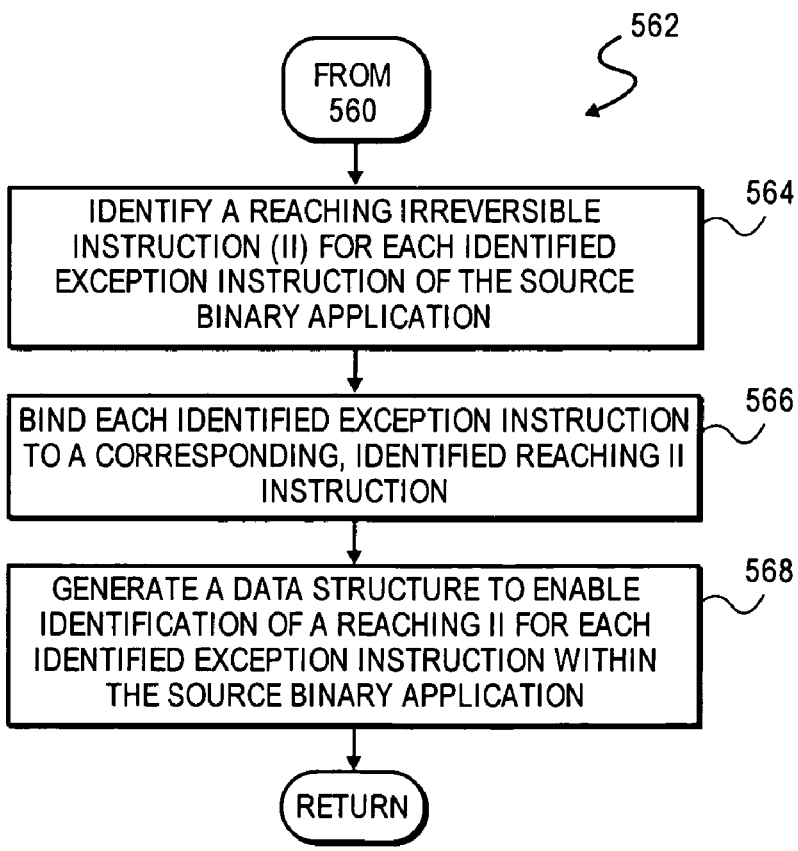
FIG. 14 is a flowchart illustrating a method for binding EI instructions with identified reaching recovery point instructions, in accordance with one embodiment.

FIG. 14 is a flow chart illustrating a method 562 for binding IE instructions with reaching II instructions of process block 560, as shown in FIG. 8, in accordance with one embodiment. At process block 564, a reaching II instruction is identified for each EI instruction of the source binding application. At process block 566, each identified EI exception is bound to a corresponding identified reaching II instruction. For example, as shown in FIG. 7, in translation region 392, EI instruction 364 is bound to pseudo II instruction 372. At process block 568, a data structure is generated to enable the identification of a reaching II for each identified EI instruction within the source binary application. For example, as shown in FIG. 7, EI reaching table 260 is populated to show that EI instruction 364 (and 324) is bound to pseudo II instruction 372 (and 326).

The above description assumes that an II instruction is not also an EI instruction, referred to herein as an EI/II instruction. For example, assume A an EI/II instruction. (See EI/II instruction 364 of FIG. 7). The SMAP information generated for A at process block 530 (FIG. 8) may be referred to as SMAP_II(A). SMAP_II(A) may represent the consistent state to recover the exceptions raised by the II instruction that A reaches. On the other hand, the SMAP information generated for A at process block 530 is referred to as SMAP_EI(A). SMAP_EI(A) may represent the consistent state to recover the exceptions raised by A.

There are various potential approaches to recover an exception caused by A. In one embodiment, the exception raised by A is directly reported without going through the interpretation process. In this embodiment, A is the reaching II instruction of itself or an EI/II instruction and uses SMAP_II(A) generated at process block 530 as SMAP_EI(A). Because (1) SMAP_II(A) represents the consistent state after a normal (no exception) execution of instruction A, and (2) when an exception happens at A, the processor restores the machine state to the state prior to the beginning of the execution of A, this embodiment relies on the assumption that the native machine has the same register states before executing A and after a normal execution of A.

In one embodiment, an interpretation process is performed to recover the exception. In this embodiment, A is treated the same as other EI instructions in computing the reaching II instruction. This makes the reaching II instruction of A different from A itself. This embodiment may not be as efficient as a previous embodiment, but it doesn't rely on the assumption of the previous embodiment. FIG. 7 illustrates the previous embodiment as EI/II instruction 362 is selected as its own reaching II instruction.

Figure 15:
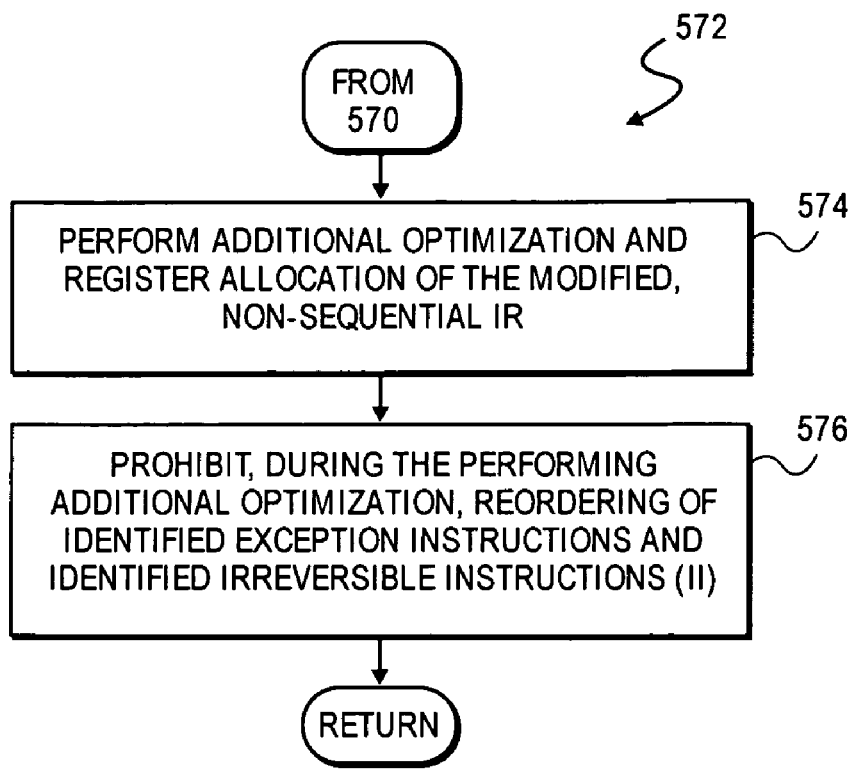
FIG. 15 is a flowchart illustrating a method for optimization of a non-sequential intermediate representation of a source binary application, in accordance with one embodiment.

Referring again to FIG. 8, following process block 560, further optimizations and register allocation are performed at process block 570, in accordance with one embodiment. At process block 570, the reordering of EI instructions and II instructions is prohibited because dong so can invalidate the SMAP information and maintaining the information for such reordering optimization is difficult. FIG. 15 illustrates a flow chart for performing a further optimization at process block 570 of FIG. 8 in accordance with one embodiment. Representatively, at process block 574, additional optimizations and register allocation are performed for modified non-sequential II 300 as shown in FIG. 7. At process block 576, reordering of identified EI instructions and II instructions is prohibited during the performance of the additional optimizations at process block 574.

In one embodiment, other optimizations, such as instruction combination and redundant load removal can create a dangling SMAP, which are eventually removed from IR 300 (FIG. 8.) Such optimizations are enhanced by removing dangling SMAP representation from IR 300 (FIG. 8.) Otherwise, optimizations should not affect SMAP representation. In one embodiment, the values used by SMAP 280 are kept for the purpose of exception handling. In one embodiment, the register allocation algorithm is extended to include the heuristics, such that the live values used by SMAP table 280 have lower spill cost to memory as compared with live values used by other instructions, assuming exceptions happen infrequently.

At process block 580, the SMAP information is extracted out from IR to construct a runtime table, referred to as EI_SMAP_Table 280 (FIG. 7), to describe the consistent state register map for each instruction. In the table, for each EI instruction, we have information (EI_ID, SMAP), where EI_ID is the unique ID to identify the EI instruction in the IR, SMAP specifies the register mapping for the consistent state.

Figure 16:
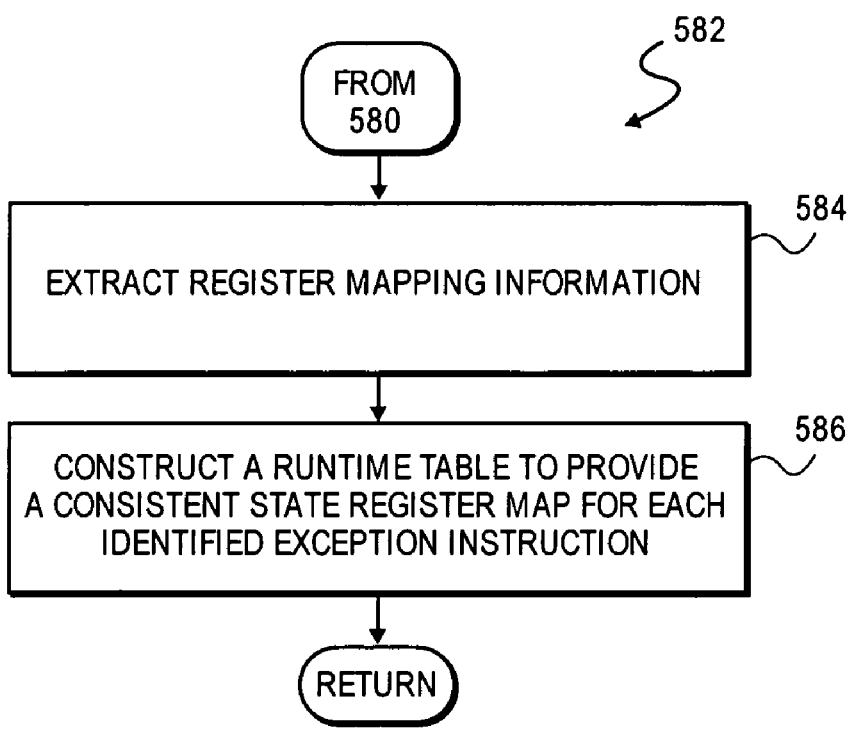
FIG. 16 is a flowchart illustrating a method for generating runtime information to enable recovery of a source ISA state prior to issuance of an exception by an EI instruction, in accordance with one embodiment.

FIG. 16 is a flow chart illustrating a method 582 for performing the SMAP information extraction of process block 580 of FIG. 8, in accordance with one embodiment. At process block 584, register mapping information is extracted from the internal representation. At process block 586, a runtime table is interrupted to provide a consistent state register map for each identified EI instruction. This table is shown as EI SMAP table 280 in FIG. 7 to illustrate EI instruction 364 of translated region 480. Information within register R1 is mapped to register EAX to provide the source register to define the consistent state and corresponding source register values indicated by EI SMAP table 280. Otherwise, it would be contained within the source registers of a source binding application 210 with sequentially executed up until the recovery point instruction 364.

Referring again to FIG. 8, at process block 590, native code is emitted, in accordance with one embodiment. The instruction ID, EI_ID is also replaced in the above runtime tables with the native instruction address for the corresponding EI instruction. As shown in FIGS. 7-16, process blocks 520, 540, 560 and 580 construct three tables, II_Source_Table 240, EI_Reach_II_Table 260 and EI_SMAP_Table 280, which provide all the needed information to support precise exceptions. An implementation may combine these tables for efficiency.

Figure 17:
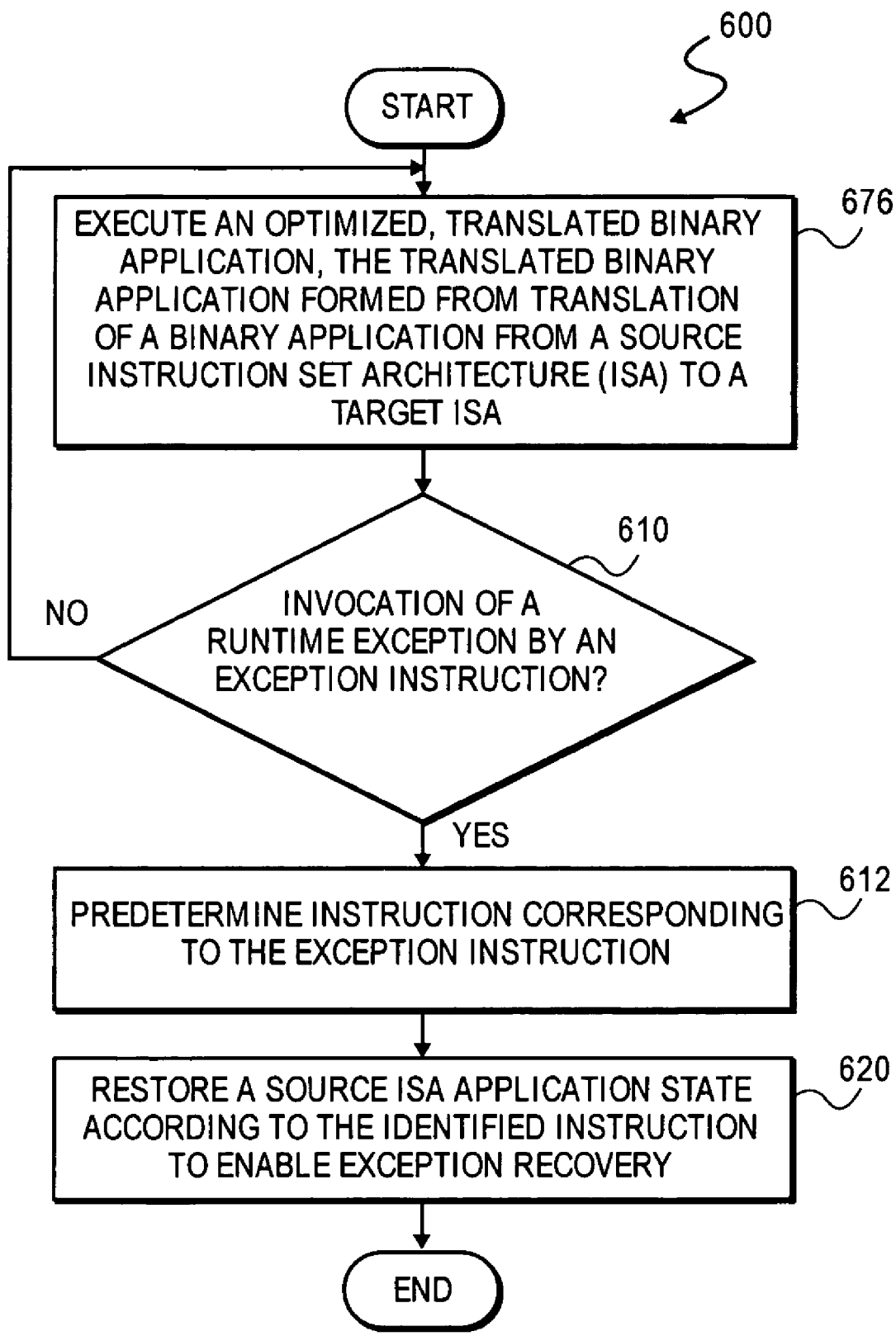
FIG. 17 is a flowchart illustrating a method for restoring a source ISA application state to enable exception recovery, in accordance with one embodiment.

FIG. 17 is a flowchart illustrating a method 600 for performing exception recovery according to a precise exception, in accordance with one embodiment. At process block 602, an optimized, translated binary application from a binary application written for a source ISA and translated to a target ISA is executed. Once executed, at process block 610, it is determined whether an EI instruction invokes a runtime exception. When such is detected, at process block 612, a predetermined instruction corresponding to the EI instruction is identified. In one embodiment, such predetermined instruction may be referred to as a "reaching II instruction" of the exception, or EI, instruction. Accordingly, at process block 620, a source ISA application state may be restored according to the identified instruction to enable exception recovery, for example, as described with reference to FIG. 18.

Figure 18:
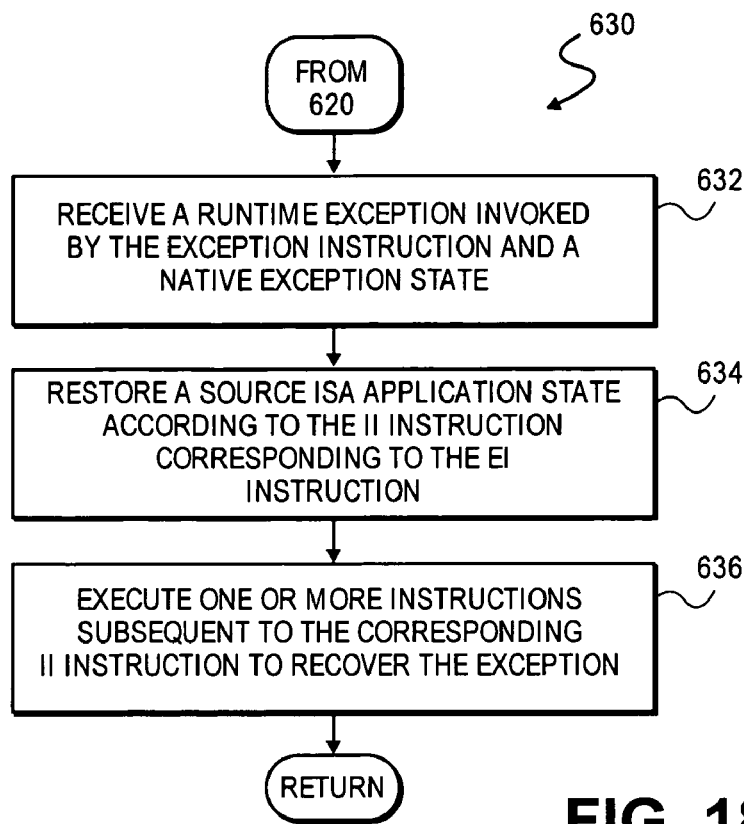
FIG. 18 is a flowchart illustrating a method for restoring the source ISA application state to enable exception recovery of FIG. 17, in accordance with one embodiment.

FIG. 18 is a flowchart illustrating a method 630 for recovering a source ISA application state, in accordance with one embodiment. At process block 630, a runtime exception invoked by the EI instruction is received in addition with a native exception state. Once received, at process block 634, a source ISA application state is restored according to the reaching II instruction corresponding to the EI instruction. Once such state is restored, at process block 636, one or more instructions subsequent to the reaching II instruction are executed to recover the exception.

Figure 19:
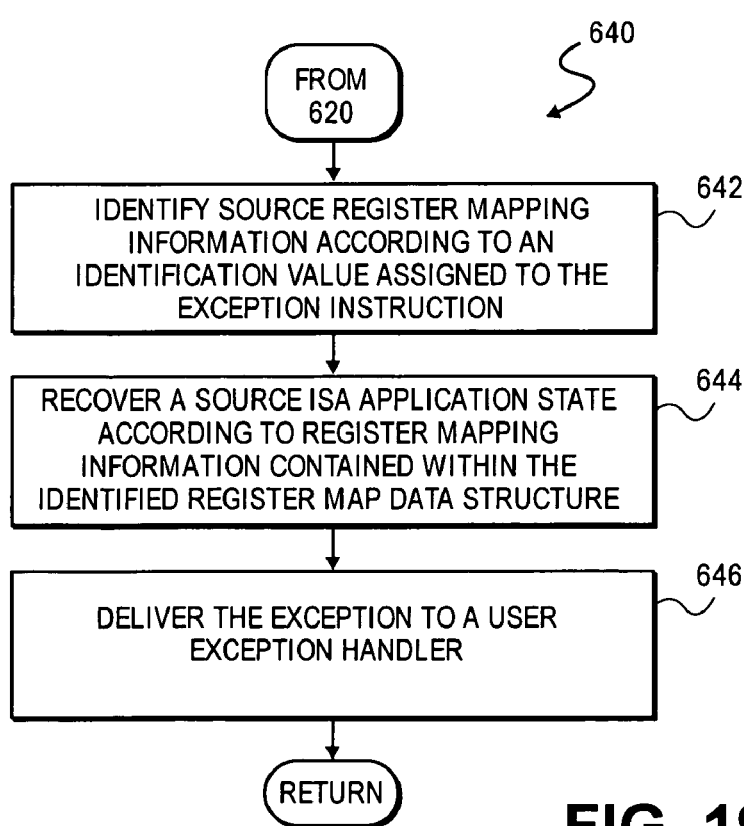
FIG. 19 is a flowchart illustrating a method for performing execution recovery at an EI instruction, in accordance with one embodiment.

FIG. 19 is a flowchart illustrating a method 640 for restoring the ISA application state at process block 620 of FIG. 17, in accordance with one embodiment. At process block 642, source register mapping information is identified according to an identification value assigned to the EI instruction. In one embodiment, such register mapping information may be contained within, for example, EI SMAP table 250, as shown in FIG. 2. At process block 644, a source ISA application state is recovered according to register mapping contained within the identified register map data structure. Once recovered, at process block 646, the exception may be delivered to an exception handler. In one embodiment, the exception recovery described with reference to FIG. 15 is based on an exception issued by an EI instruction, which is both an EI instruction and an II instruction.

Figure 20:
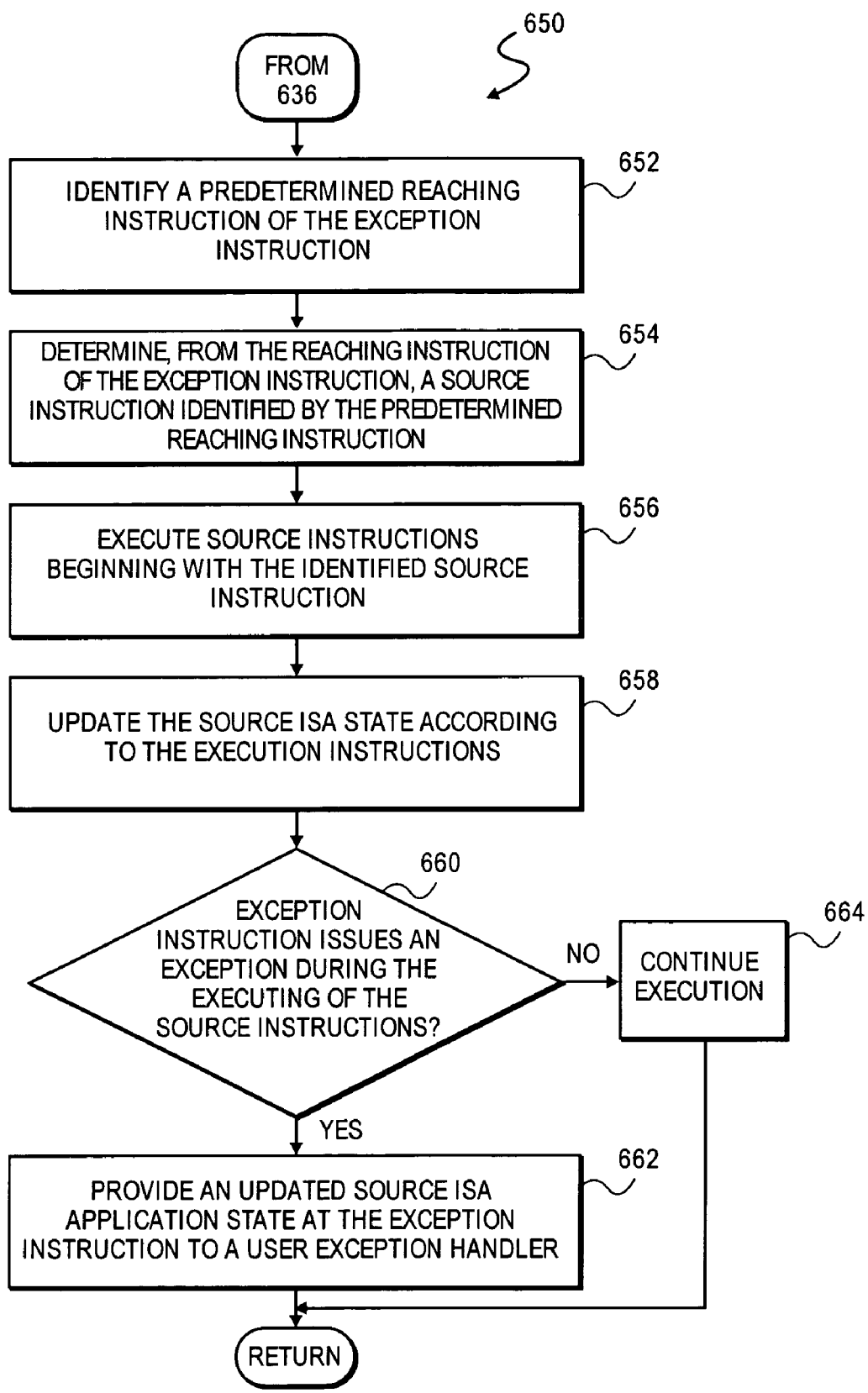
FIG. 20 is a flowchart illustrating a method for executing source ISA instructions subsequent to a recovery point instruction, in accordance with one embodiment.

Conversely, FIG. 20 illustrates a method 650 for exception recovery for an exception caused by EI instruction having a reaching II instruction, in accordance with one embodiment. At process block 652, a predetermined reaching instruction of the EI instruction is identified. Once identified, a source instruction is determined from the reaching instruction of the EI instruction. In one embodiment, such source instruction is the source instruction immediately following the corresponding reaching II instruction of the EI instruction. Once determined, at process block 656, source instructions are executed beginning with the identified instruction. As such source instructions are executed, at process block 658, a source ISA application state is updated. As such updating continues, at process block 660, it is determined whether the EI instruction issues an exception during the execution of the source instruction. When such exception is issued, at process block 662, an updated source ISA application state at the EI instruction is provided to a user exception handler. Otherwise, execution continues until the end of the translated block.

Accordingly, if an exception happens at runtime, the OS delivers the exception and the native exception state to the DBT exception handler. As shown by FIGS. 18-20, DBT handles the exception as follows: (1) use the EI_ID to find the corresponding SMAP in EI_SMAP_Table; (2) Use the EI_ID to find the corresponding II_ID.

In one embodiment, if EI_ID and II_ID are the same, the EI instruction is also an II instruction, referred to herein as an EI/II instruction. Accordingly, DBT 200 may recover the consistent state using the SMAP table 280 and delivers the exception to the user exception handler as shown in FIGS. 2 and 19. instruction. In one embodiment the II_ID may be used to find the corresponding II_NSA in II_Source_Table 240. Accordingly, DBT 200 may recover the consistent state using the SMAP_info from SMAP table 280 and starts the interpretation from the source instruction corresponding to II_NSA (recovery point instruction) to recover the exception.

Accordingly, by incorporating exception recovery information into an intermediate representation, a DBT, such as DBT 200, is shown in FIGS. 1 and 2, may represent the values that are needed for precise exceptions as regular value is used by IR instructions. In one embodiment, this allows DBT 200 to treat values used by exception handling in a similar way that other program values are treated. In doing so, support for precise exceptions is enabled while providing reduced optimization constraints. Accordingly, DBT can use an exception recovery mechanism to decide whether an exception should be made visible to the application and the precise machine states the obligation should see at the exception point.

Accordingly, DBT 200 may allow optimizations of class boundaries of II instructions with the only explicit constraints are prevented in the movement of an EI instruction downward passing an II instruction. Accordingly, the DBT 200 as described herein may be utilized for binary translation with different hardware configurations, such as binary translation from a source machine with the big registered file to a native machine with a small register file. In a further embodiment, the SMAP presentation allows DBT to treat value needed to reconstruct consistent states if they were used by regular instructions. Thus, DBT can naturally perform optimization on those values. The scope of the optimizations can naturally go beyond commit point instructions.

Elements of embodiments of the present invention may also be provided as a machine accessible storage medium for storing the machine-executable instructions. The machine accessible storage medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards or other type of machine accessible storage media suitable for storing electronic instructions.

It should be appreciated that reference throughout this specification to "one embodiment" or "an embodiment" means that a particular feature, structure or characteristic described in connection with the embodiment is included in at least one embodiment. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of the various embodiments, reference is made to the accompanying drawings, which show by way of illustration, and not of limitation, specific embodiments in which the teachings disclosed herein may be practiced. In the drawings, like numerals describe substantially similar components throughout the several views. The embodiments illustrated are described in sufficient detail to enable those skilled in to the art to practice the teachings disclosed herein. Other embodiments may be utilized and derived therefrom, such that structural and logical substitutions and changes may be made without departing from the scope of this disclosure. The above detailed description, therefore, is not to be taken in a limiting sense, and the scope of various embodiments is defined only by the appended claims, along with the full range of equivalents to which such claims are entitled.

Having disclosed embodiments and the best mode, modifications and variations may be made to the disclosed embodiments while remaining within the scope of the embodiments as defined by the following claims.

What is claimed is:

1. A computer implemented method comprising:
   translating a source binary application, generated for a source instruction set architecture (ISA), into a sequential intermediate representation (IR) of the source binary application;
   identifying each exception instruction within the source ISA binary application;
   identifying a predetermined reaching instruction within the sequential IR of the source ISA binary application for each of the identified exception instructions;
   identifying one or more irreversible instructions within the source ISA binary application;
   generating an irreversible instruction (II) data structure;
   storing an identification assigned to each of the one or more irreversible instructions identified from the source binary application within the II data structure;
   selecting a recovery point instruction as a source instruction immediately following the identified irreversible instruction;
   storing an address of the source instruction immediately following the identified irreversible instruction within the II data structure to form exception recovery information for the identified exception instructions;
   modifying the sequential IR to incorporate the exception recovery information for the identified exception instructions, identified from the source ISA binary application, to form a modified, non-sequential IR; and
   optimizing the modified, non-sequential IR to form an optimized, translated binary application for a target ISA that incorporates the exception recovery information to enable exception recovery.

2. The method of claim 1, further comprising:
   generating at least one instruction within the sequential IR to store at least one source register value required to recover a consistent state at a predetermined instruction of the sequential IR; and
   generating a state register mapping data structure to provide a target ISA to source ISA register mapping according to the generated, IR instruction.

3. The method of claim 1, wherein modifying the sequential IR information further comprises:
   inserting a pseudo irreversible instruction (II) at an entry of each translated region within the sequential IR;
   inserting a pseudo II at each control flow joint for each translated region having a control-flow joint; and
   storing information regarding each inserted pseudo II within an II data structure.

4. The method of claim 3, wherein inserting pseudo II at each control flow joint further comprises:
   identifying each basic block within the sequential IR that includes an identified exception instruction; and inserting a pseudo II at a beginning of each basic block in an iterative dominance frontier:

DF⁺(S), where S represents each basic block of the sequential IR with an identified exception instruction.

5. The method of claim 1, wherein modifying the sequential IR comprises:
performing code motion to optimize the sequential IR of the source binary application to form a non-sequential IR; and
prohibiting, during the performing of code motion, movement of an identified exception instruction beyond one of an identified irreversible instruction (II) and an inserted, pseudo II.

6. The method of claim 1, wherein incorporating exception recovery information further comprises:
identifying a reaching irreversible instruction (II) for each identified exception instruction of the source binary application, wherein the reaching II is one of an identified II of the source binary application and an inserted, pseudo II;
binding each identified exception instruction to a corresponding, identified reaching II instruction; and
generating a data structure to enable identification of a reaching II for each identified exception instruction within the source binary application.

7. The method of claim 5, optimizing the modified IR comprising:
performing additional optimization and register allocation of the modified, non-sequential IR; and
prohibiting, during the performing additional optimization, reordering of identified exception instructions and identified irreversible instructions (II).

8. The method of claim 1, further comprising:
extracting register mapping information to construct a runtime table to provide a consistent state register map for each identified exception instruction;
emitting target code; and
replacing identification values within one or more runtime tables with source instruction addresses for each corresponding identified exception instruction.

9. An article of manufacture having a machine accessible storage medium including associated instructions, wherein the instructions, when executed, result in the machine comprising at least one component performing:
identifying, during translation of a binary application from a source instruction set architecture (ISA) to a target ISA, each exception instruction within the source ISA binary application;
identifying a predetermined reaching instruction within a sequential intermediate representation (IR) of the source ISA binary application for each of the identified exception instructions;
identifying one or more irreversible instructions within the source ISA binary application;
generating an irreversible instruction (II) data structure;
storing an identification assigned to each of the one or more irreversible instructions identified from the source binary application within the II data structure;
selecting a recovery point instruction as a source instruction immediately following the identified irreversible instruction;
storing an address of the source instruction immediately following the identified irreversible instruction within the II data structure to form exception recovery information for the identified exception instructions;
executing an optimized, translated binary application, the translated binary application formed from the sequential IR of the binary application that is further optimized for a target ISA to form the optimized, translated binary application that incorporates the exception recovery information for the identified exception instructions to enable exception recovery;
identifying, following invocation of a runtime exception by an exception instruction, a predetermined instruction corresponding to the exception instruction; and
restoring a source ISA application state according to the identified instruction to enable exception recovery using the exception recovery information.

10. The article of manufacture of claim 9, wherein identifying the predetermined instruction further results in the machine performing:
receiving a runtime exception invoked by the exception instruction and a native exception state;
restoring a source ISA application state according to the instruction corresponding to the exception instruction; and
executing one or more instructions subsequent to the corresponding instruction to recover the exception.

11. The article of manufacture of claim 9, wherein restoring the source ISA application state further comprises:
identifying source register mapping information according to an identification value assigned to the exception instruction;
recovering a source ISA application state according to register mapping information contained within the identified register map data structure; and
delivering the exception to a user exception handler.

12. The article of manufacture of claim 10, wherein executing the one or more instructions further comprises:
identifying a predetermined reaching instruction of the exception instruction;
determining, from the reaching instruction of the exception instruction, a source instruction identified by the predetermined reaching instruction;
executing source instructions beginning with the identified source instruction;
updating the source ISA state according to the execution instructions; and
providing an updated source ISA application state at the exception instruction to a user exception handler if the exception instruction issues an exception during the executing of the source instructions.

13. A system comprising:
a processor;
a memory controller coupled to the processor; and
a memory coupled to the memory controller, the memory controller including a binary translator to identify, during translation of a binary application from a source instruction set architecture (ISA) to a target ISA, each exception instruction within the source ISA binary application, to identify a predetermined reaching instruction within a sequential intermediate representation (IR) of the source ISA binary application for each of the identified exception instructions, to identify one or more irreversible instructions within the source ISA binary application, to generate an irreversible instruction (II) data structure, to store an identification assigned to each of the one or more irreversible instructions identified from the source binary application within the II data structure, to select a recovery point instruction as a source instruction immediately following the identified irreversible instruction, to store an address of the source instruction immediately following the identified irreversible instruction within the II data structure to form exception recovery information for the identified exception instructions, wherein the binary translator to incorporate the exception recovery information for the identified exception instructions into the sequential IR of the source binary application, to form a modified, non-sequential IR and to optimize the modified, non-sequential IR to form an optimized, translated binary application for a target ISA that incorporates the exception recovery information for the identified exception instructions to enable exception recovery.

14. The system of claim 13, wherein the translator is further to generate at least one instruction within the sequential IR to store at least one source register value required to recover a consistent state at a predetermined instruction of the sequential IR and to generate a state register map data structure to provide a target ISA to source ISA register mapping according to the generated IR instruction.

15. The system of claim 13, wherein the translator is further to insert a pseudo reaching instruction at the entry of each translated region within the IR, to insert a pseudo reaching instruction at each control flow joint for each translated region having a control flow joint and to store information regarding each inserted reaching instruction within a data structure.

16. The system of claim 13, wherein the translator is further to perform code motion to optimize the sequential IR of the source binary application to form a non-sequential IR and to prohibit movement of an identified exception instruction beyond one of an identified irreversible instruction and an inserted pseudo irreversible instruction.

17. The system of claim 13, wherein the translator is further to identify a reaching irreversible instruction (II) for each identified exception instruction of the source binary application, wherein the reaching II is one of an identified II of the source binary application and an inserted pseudo II, to bind each identified exception instruction to a corresponding, identified reaching II and to generate a data structure to enable the identification of a reaching II for each identified exception instruction within the source binary application.

* * * * *